United States Patent [19]

Atkinson et al.

[11] Patent Number: 4,792,491

[45] Date of Patent: Dec. 20, 1988

[54] GASKETS

[75] Inventors: Alan Atkinson, Rochdale; Katryna Dearden; Janet Lancaster, both of Littleborough, all of England

[73] Assignee: T & N Materials Research Limited, Manchester, England

[21] Appl. No.: 935,486

[22] Filed: Nov. 26, 1986

Related U.S. Application Data

[63] Continuation-in-part of Ser. No. 800,907, Nov. 25, 1985, abandoned, and a continuation of Ser. No. 536,977, Sep. 9, 1983, abandoned.

[30] Foreign Application Priority Data

| Oct. 1, 1982 | [GB] | United Kingdom | 8228156 |
| Sep. 26, 1983 | [EP] | European Pat. Off. | 83305728.4 |
| Sep. 27, 1983 | [CA] | Canada | 437666 |
| Sep. 28, 1983 | [AU] | Australia | 19664/83 |
| Sep. 30, 1983 | [JP] | Japan | 58-182966 |
| Sep. 30, 1983 | [ZA] | South Africa | 83/7336 |
| Sep. 30, 1983 | [ES] | Spain | 526146 |

[51] Int. Cl.$^4$ .............................................. B05D 5/00
[52] U.S. Cl. .......................... 428/408; 277/DIG. 6; 427/180; 427/198; 427/275; 427/299
[58] Field of Search ............... 427/180, 202, 299, 198, 427/275; 428/408; 277/DIG. 6

[56] References Cited

U.S. PATENT DOCUMENTS

| 4,022,937 | 5/1977 | Bennett et al. | 427/180 |
| 4,075,114 | 2/1978 | Ishikawa et al. | 252/62 |
| 4,140,323 | 2/1979 | Jacobs | 227/207 |

FOREIGN PATENT DOCUMENTS

| 0150780 | 7/1985 | European Pat. Off. | |
| 640035 | 7/1950 | United Kingdom | 427/180 |

*Primary Examiner*—Shrive Beck
*Attorney, Agent, or Firm*—Nixon & Vanderhyde

[57] ABSTRACT

Graphite gaskets with an improved release characteristic are treated with a finely powdered release agent such a graphite powder which is then pressed into the gasket surface.

10 Claims, No Drawings

GASKETS

This application is a continuation-in-part of Ser. No. 800,907 filed Nov. 25, 1985, now abandoned as a continuation of Ser. No. 536,977, filed Sept. 9, 1983 and now abandoned.

TECHNICAL FIELD OF THE INVENTION

This invention relates to gaskets exhibiting improved release characteristics after use in a joint between mating parts. In particular it relates to gaskets made from flakes of expanded graphite.

Gaskets and in particular cylinder head gaskets, should ideally be readily removable on dismantling the joints in which they have been used, even after long service. However, many gasket materials and especially graphite tend to adhere very firmly to the mating faces of a joint. Graphite gaskets for example both adhere very firmly and tend to de-laminate easily after use, leaving large amounts of graphite adhered to one or both faces of the joint. Before the joint can be made good again, with a new gasket, the mating faces have to be cleaned by scraping off the adherent material, with the attendant risk of dislodged material entering passageways through the component parts of the joint, such as oil and/or waterways. Scraping may also cause mechanical damage to the joint faces.

THE PRIOR ART

Adhesion of gasket materials is an old problem. Various solutions have been proposed, including the use of release agents such as mica, aluminium powder, talc, soaps, soapstone, ptfe, silicone rubbers and varnishes. Apart from the ephemeral nature of powder treatments and the easily-abraded character of silicone rubber layers on graphite, there are also the effects of temperature, pressure and time to consider. Considerable temperature variations exist in a cylinder head assembly for example. In the case of graphite, none of the known release treatments is particularly effective, especially for cylinder head gaskets.

BRIEF DESCRIPTION OF THE INVENTION

According to the present invention a method of making a graphite gasket includes the steps of coating the gasket with a finely powdered release agent, followed by pressing the coating to bond the powder into the surface of the gasket.

PREFERRED FEATURES OF THE INVENTION

The pressing step may be a calendering treatment or it may be pressing between platens; it is preferably applied cold; i.e. at ambient temperature. The coating step may be preceded by a preliminary pressing step; this step may also be a calendering treatment or pressing between platens and it may be applied to a relatively low density gasket perform so as to reduce its void content. However, the preliminary pressing step may equally well be employed to make the preform (or the gasket) directly from expanded graphite flake.

The pressing step used to press the powder into the surface of the gasket may be an embossing step, so as to form a relief pattern comprising raised areas, or islands, surrounded by predominantly interconnected, depressed regions. This can be accomplished by pressing or rolling the coated graphite against a woven monofilament cloth, although engraved embossing rollers or press platens may also be used. Pressing/rolling against expanded wire mesh may also be used to develop the desired relief pattern.

One form of embossing of gasket material is known from German patent publication OLS No. 2646832. However, that document is concerned with forming relatively soft interconnected raised portions and hard isolated depressed regions over the face of a gasket in order to provide sealing regions and stress-resisting regions, respectively. This particular embossing treatment for graphite cylinder head gaskets has been found to be ineffective as regards release performance after service.

It has been found that the combination of treating with a powdered release agent and then pressing the agent into the surface of the graphite gives better results in a cylinder head gasket than does any of the prior proposals, particularly if the pressing steps combined with embossing, as described above.

DESCRIPTION OF PREFERRED EMBODIMENTS

In order that the invention be better understood a preferred embodiment of it will now be described with reference to the following example.

EXAMPLE

Exfoliated (expanded) graphite flakes of density 4 kg/m$^3$ were lightly pressed to give a sheet preform of density 30 kg/m$^3$ at a thickness of 20 mm. The preform was repeatedly passed through cold calender rolls (at room temperature) the calender nip being progressively reduced in 1.5 mm steps to develop a final graphite density of 1500 kg/m$^3$ at thickness of 0.4 mm. Six to ten passes of the calender were needed for this.

The pressed sheet was then treated on both sides with a proprietary amorphous graphite powder (LUXARA grade 1, 33 $\mu$M maximum particles size applied by brush, followed by a light calendering effective to bond the powder into the gasket surface. To accomplish this, the sheet produce was covered on each face with a piece of woven polyester monofilament bolting cloth (0.15 mm monofilaments 0.4 mm apart) and passed through a roller nip.

Platen pressing at 7 MPa (1000 psig) was equally effective to emboss into the graphite surface the weave pattern, forming a network of interconnected depressed regions, whilst at the same time bonding the powder into the gasket surface.

The process was then repeated, but using powdered Chinese talc instead of the amorphous graphite powder. The talc used has a particle size such that less than 5% was retained on a 200 mesh screen.

Test Procedure

The product was robust and showed little tendency for the release agent to be abraded on handling. It was tested in a laboratory test rig comprising two thick discs of cast iron and aluminium, respectively, clamped together by means of a nut and bolt. The mating faces were machined to a finish of 50 $\mu$m and were thinly coated with ordinary engine oil prior to use. A sample of the treated graphite sheet was clamped between the discs at 1500 psg (1.055×10$^{-2}$ kg/m$^2$.) The rig was placed into an oven and held at a test temperature of 150° C. After 25 hours, it was removed from the oven and allowed to cool naturally before unbolting the assembly and separating the discs to see how much (if any) graphite had adhered to each of them. Untreated graphite adheres totally and completely delaminates in this test. Graphite treated according to the invention released much more easily. This was confirmed in a further test at 550° C.

Similar, but not quite as good results were obtained using the Chinese powdered talc.

We claim:

1. A method of making a gasket from exfoliated graphite, including the steps of:
   (a) coating the gasket with a finely powdered exfoliated graphite release agent followed by
   (b) pressing the coating with pressure sufficient to bond the release agent into the surface of the gasket, and
simultaneously embossing the coated gasket to form a pattern of relatively raised regions surrounded by predominantly interconnected depressed regions.

2. The method of claim 1 wherein the pressing step comprises calendering or pressing between platens.

3. The method of claim 1 wherein the pressing step is carried out at ambient temperature.

4. The method of claim 1, wherein a preliminary pressing step is applied to a relatively low density graphite preform so as to reduce the void content hereof prior to the coating step.

5. The method of claim 4 wherein the preliminary pressing step comprises calendering or pressing between platens.

6. The method of claim 1 wherein the embossing is carried out by pressing the graphite against a woven fabric or against an expanded metal mesh.

7. The method of claim 1 wherein the embossing is carried out by pressing the graphite against a woven monofilament cloth.

8. The method of claim 1 wherein the embossing step is carried out by means of embossing rollers or press platens.

9. The method of claim 1 wherein the release agent is amorphous graphite or talc.

10. A graphite gasket made by the method of claim 1.

* * * * *